(12) United States Patent  (10) Patent No.: US 8,677,730 B2
Negre et al.  (45) Date of Patent: Mar. 25, 2014

(54) LOW-TEMPERATURE MOTOR COMPRESSOR UNIT WITH CONTINUOUS "COLD" COMBUSTION AT CONSTANT PRESSURE AND WITH ACTIVE CHAMBER

(75) Inventors: Guy Negre, Carros Cedex (FR); Cyril Negre, Carros Cedex (FR)

(73) Assignee: MDI Motor Development International S.A., Luxembourg (LU)

( * ) Notice: Subject to any disclaimer, the term of this patent is extended or adjusted under 35 U.S.C. 154(b) by 1763 days.

(21) Appl. No.: 11/993,351

(22) PCT Filed: Jun. 23, 2006

(86) PCT No.: PCT/FR2006/001444
 § 371 (c)(1),
 (2), (4) Date: Feb. 12, 2008

(87) PCT Pub. No.: WO2006/136728
 PCT Pub. Date: Dec. 28, 2006

(65) Prior Publication Data
 US 2010/0218750 A1  Sep. 2, 2010

(30) Foreign Application Priority Data

Jun. 24, 2005 (FR) ...................................... 05 06437

(51) Int. Cl.
 *F01K 25/00* (2006.01)
 *F02G 1/044* (2006.01)
 *F02G 3/02* (2006.01)

(52) U.S. Cl.
 USPC .......... 60/39.63; 60/39.6; 60/39.826; 60/369; 60/671; 60/377; 123/540; 123/179.21; 123/543; 123/563

(58) Field of Classification Search
 USPC ........ 60/597, 39.464, 39.6, 39.826, 369–371, 60/645–681, 69.3; 417/228; 123/70 R, 68, 123/71 R, 320, 145 R, 179.21, 540–543, 123/563, 573; 177/217, 245
 See application file for complete search history.

(56) References Cited

U.S. PATENT DOCUMENTS

| 6,675,781 | B1 | 1/2004 | Markley |
| 8,276,384 | B2 * | 10/2012 | Negre et al. ..................... 60/671 |
| 2007/0163261 | A1 * | 7/2007 | Strathman ....................... 60/651 |

FOREIGN PATENT DOCUMENTS

| DE | 32 19 797 A1 | 12/1983 | |
| DE | 199 62 591 A1 | 7/2001 | |
| DE | 19962591 A1 * | 7/2001 | ............... F02G 1/02 |
| GB | 1 300 000 A | 12/1972 | |
| GB | GB 1300000 * | 12/1972 | ............... F02G 3/02 |
| WO | 2005/049968 A1 | 6/2005 | |

OTHER PUBLICATIONS

International Search Report of PCT/FR2006/001444 filed Jun. 23, 2006, date of mailing Dec. 1, 2006.

* cited by examiner

*Primary Examiner* — Lindsay Low
*Assistant Examiner* — Kevin Lathers
(74) *Attorney, Agent, or Firm* — Young & Thompson

(57) ABSTRACT

Low-temperature, continuous "cold" combustion, constant pressure, active chamber motor-compressor unit operating with working compressed air and using a piston travel control device as well as an active chamber, with a cold chamber (29) able to reduce to very low temperatures the atmospheric air that supplies the input (28) of an air compression device (28,25,26,33), which then forces this working compressed air, still at low temperature, in an external combustion chamber (19) fitted with a heating device (19A) at constant pressure where it increases in volume, before its quasi-isothermal transfer in the active chamber (13) producing work, before being expanded in an engine cylinder (2) to produce work again.

18 Claims, 7 Drawing Sheets

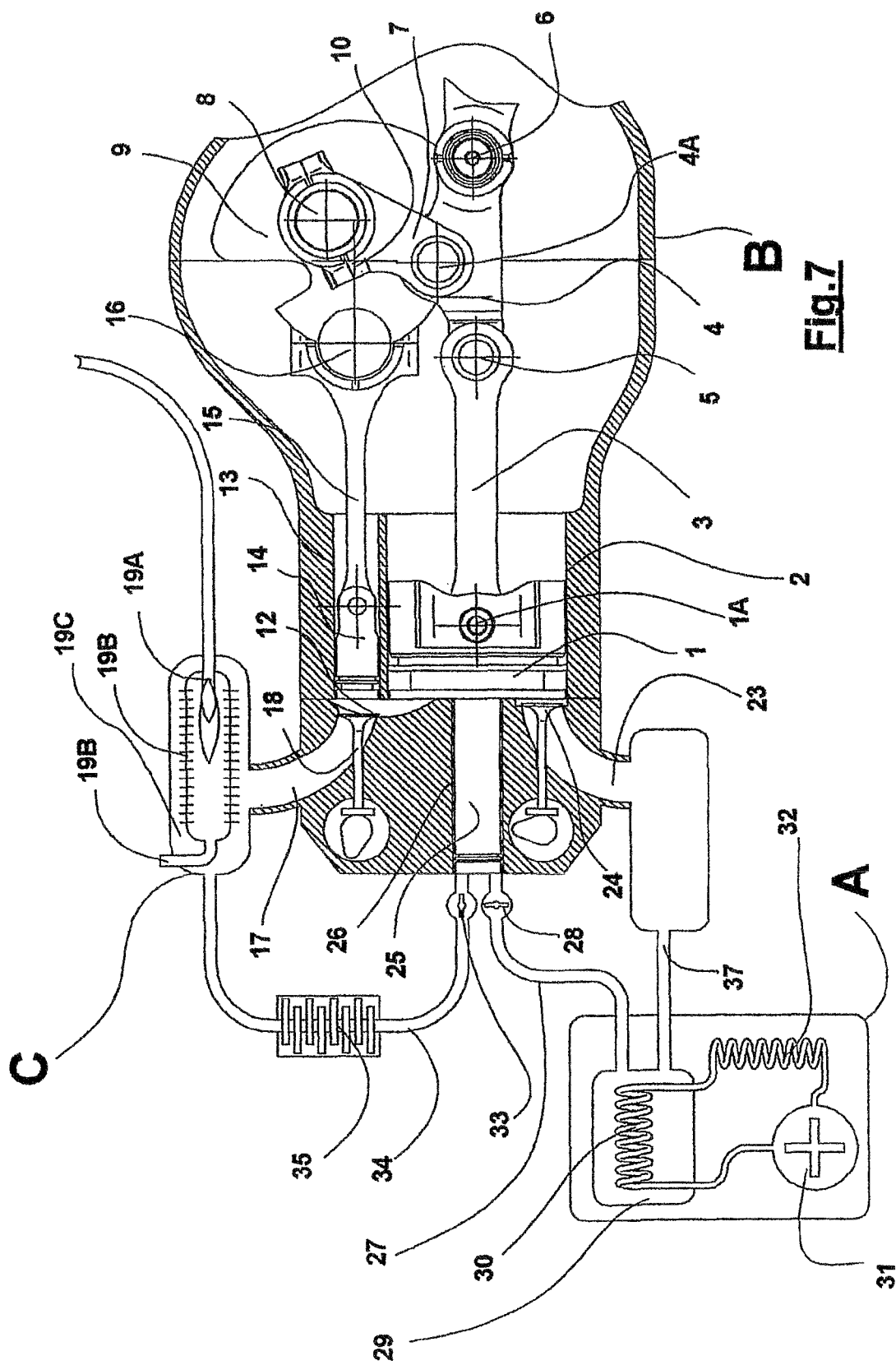

LOW-TEMPERATURE MOTOR COMPRESSOR UNIT WITH CONTINUOUS "COLD" COMBUSTION AT CONSTANT PRESSURE AND WITH ACTIVE CHAMBER

BACKGROUND OF THE INVENTION

This invention deals with a motor-compressor unit that runs on compressed air, and more particularly, using a piston travel control device that stops the piston at top dead centre for a period of time and engine rotation, together with a variable-volume work-producing active chamber, an integrated (or not) compression device, and a device for recovering ambient thermal energy. It can operate in mono-energy mode (fuel or compressed air) or in bi-energy mode (fuel and compressed air, simultaneously or successively).

DESCRIPTION OF THE RELATED ART

The author has registered numerous patents concerning drive systems and their installations that use compressed air for totally clean operation in urban and suburban situations:

| | | |
|---|---|---|
| WO 96/27737 | WO 97/00655 | WO 97/39232 |
| WO 97/48884 | WO 98/12062 | WO 98/15440 |
| WO 98/32963 | WO 99/37885 | |

To implement these inventions, he has also described, in his patent application WO 99/63206, to which reference should be made, an engine piston travel control device and process that enables the piston to be stopped at top dead centre. This process is also described in his patent application WO 99/20881, to which reference should also be made, concerning the operation of these engines in mono- or bi-energy and two or three supply modes.

In his patent application WO 99/37885, to which reference should also be made, he proposes a solution that increases the amount of energy available for use through the fact that, before being introduced into the combustion and/or expansion chamber, the compressed air coming from the storage reservoir either directly or via the heat exchanger(s) of the ambient thermal energy recovery device is channelled into a thermal heater where, by increasing its temperature, the pressure and/or volume is further increased before it is introduced into the combustion and/or expansion chamber of the engine, thus further considerably improving the performance that can be obtained by this engine.

Using a thermal heater has the advantage, when using fossil fuel, of providing clean, continuous combustion that can be catalysed or depolluted by any existing means in order to obtain minimal polluting emissions.

The author has registered a patent no. WO 03/036088, to which reference should be made, dealing with a motor-compressor-motor generator unit with supplementary compressed-air injection operating in mono- or multi-energy.

In these types of engine running on compressed air and containing a high-pressure compressed-air storage reservoir, the compressed air held at high pressure in the reservoir but whose pressure reduces as the reservoir is emptied, must be lowered to a stable intermediate pressure, known as the final usage pressure, in a buffer tank before being used in the engine cylinder(s). The well-known conventional pressure-reducing valves using diaphragms and springs have very low flow rates, and their use for this application requires very heavy, poorly-performing devices. Furthermore, they are very susceptible to freezing due to the humidity of the air cooled during the pressure drop.

To resolve this problem, the author has also registered a patent WO 03/089764, to which reference should also be made, dealing with a variable flow-reducing valve for compressed-air-injection engines with a high-pressure compressed-air reservoir and a buffer tank.

The author has also registered a patent WO 02/070876 dealing with a variable-volume expansion chamber consisting of two separate tanks, one of which communicates with the compressed-air inlet and the other is linked to the cylinder. They may be connected together or isolated from each other in such a way that, during the exhaust cycle, the first tank can be charged with compressed air, and the pressure in the second can than be established at the and of the exhaust cycle while the piston is at TDC, before restarting its travel. The two tanks remain in communication and release pressure together to perform the engine stroke, with at least one of the tanks provided with a means of changing its volume to enable the resultant torque of the engine to be varied at equal pressure.

In these pressure-reduction devices, the filling of the chamber always reduces the general efficiency of the machine.

To resolve the latter problem, the author has also registered a patent no. WO 2005/049968, dealing with an active chamber engine that uses a device for stopping the piston at top dead centre. It is powered preferably by compressed air or any other compressed gas contained in a high-pressure storage reservoir, through a buffer capacity known as a work capacity. The work capacity in the bi-energy version includes an air heating device powered by a supplementary energy (fossil or other energy) to increase the temperature and volume of the air passing through it. The work capacity is thus an external combustion chamber.

In this type of engine, the internal expansion chamber of the engine consists of a variable volume fitted with the means to produce work, which is joined to and in contact with the space contained above the main engine piston by means of a permanent passage. While the piston is stopped at top dead centre, the working air is admitted under pressure into the expansion chamber at its smallest volume which, under the thrust, will increase and produce work. The working compressed air contained in the expansion chamber then expands in the engine cylinder, thus pushing the engine piston and supplying work in turn. Then, as the engine piston rises during the exhaust stroke, the variable volume in the expansion chamber returns to its smallest volume to restart a complete work cycle.

The thermodynamic cycle of an active chamber engine therefore comprises four phases in mono-energy compressed-air mode:

An isothermal expansion without work

A transfer—slight expansion with work, known as quasi-isothermal

A polytropic expansion with work,

An exhaust at quasi-ambient pressure.

In its bi-energy application in supplementary fuel mode, an air compressor feeds either the high-pressure reservoir or the work capacity (combustion chamber) or even both volumes in combination.

The active chamber engine can also be manufactured in fossil fuel mono-energy. In aversion as described above, the high-pressure compressed-air storage reservoir is thus purely and simply removed.

The active chamber engine is an external combustion chamber engine, however, the combustion in the heater can be either internal, known as "external-internal", where the flame is applied directly to the working compressed air, or external, known as "external-external", where the air is heated through a heat exchanger.

This type of engine uses constant-pressure and variable-volume combustion according to the relations:

PV1=nRT1

PV2=nRT2

Where P is constant V1/V2=T1/T2

The effect of increasing the temperature at constant pressure increases the volume of compressed air in the same proportion. Increasing the volume by N times would require the same increase of N times the temperature.

In bi-energy mode and autonomous operation with supplementary energy, and when the compressed air is admitted into the high-pressure reservoir, the thermodynamic cycle thus consists of seven phases:
Suction
Compression
Isothermal expansion in the work capacity
Temperature increase
Transfer—slight expansion with work (known as quasi-isothermal)
Polytropic expansion with work
Exhaust at quasi-ambient pressure.

When the compressed air is admitted directly into the work capacity or combustion chamber, the thermodynamic cycle consists of six phases and becomes:
Suction
Compression
Temperature increase
Transfer—slight expansion with work, known as quasi-isothermal,
Polytropic expansion with work
Exhaust at quasi-ambient pressure.

In this type of engine, in bi-energy application, the temperature of the compressed air admitted into the work capacity or combustion chamber occurs at ambient or higher temperature, approximately equal if the compressed air comes from the high-pressure storage reservoir and higher if it comes directly from the compressor. The volume is increased in the next phase of the cycle by increasing the temperature.

The temperature of the air arriving directly from the compressor can reach values of the order of 400° C. above ambient.

To clarify, by way of a non-exhaustive example: to supply an active chamber of 30 cc at 30 bar pressure, a load of 5 cc of compressed air removed from a storage reservoir and introduced into a working and heating chamber at 30 bar pressure and at the ambient temperature of 293 K (20° C.) requires a combustion that will raise the temperature to 6 times its initial value, i.e. 1758 K or 1485° C.

If the load of 5 cc arrives directly from the compressor, it is already at a temperature of approximately 693° K (420° C.), so for the same result, the temperature of the load must be raised to 2158° K or 1885° C.

The use of high temperatures in the external combustion chamber causes numerous constraints as regards materials, cooling and pollution, in particular by NOx (nitrogen oxides) which are formed above 1000° C.

SUMMARY OF THE INVENTION

The low-temperature, continuous "cold" combustion, constant pressure, active chamber motor-compressor unit according to the invention, proposes to remove these constraints by providing equivalent performance using much cooler combustions that, paradoxically, also provide a considerable improvement in the machine's efficiency.

The low-temperature, active chamber motor-compressor unit is characterized by the means used, taken together or separately, and in particular:
in that it includes a cold chamber that cools air from the atmosphere to very low temperatures to be fed into an air compression device, which then forces this working compressed air, still at low temperature, into a work capacity or external combustion chamber fitted with an air heating device, where its volume increases considerably. It is then preferably introduced into an active chamber according to WO 2005/049968 itself characterized:
in that while the piston is stopped at top dead centre, the air or gas under pressure is admitted into the expansion chamber at its smallest volume and which then, under the thrust, increases its volume and produces work,
in that the compressed air contained in the expansion chamber then expands in the engine cylinder, thus pushing the engine piston downwards along its travel and supplying work in turn,
in that during the upwards travel of the engine piston during the exhaust stroke, the variable volume in the expansion chamber is returned to its smallest volume to restart a complete work cycle.

According to the invention, the thermodynamic cycle is thus characterized by seven phases:
Large lowering of atmospheric air temperature
Suction
Compression
Temperature increase (combustion at constant volume)
Quasi-isothermal transfer
Polytropic expansion
Exhaust at quasi-ambient pressure.

The low-temperature motor-compressor unit using the thermodynamic cycle according to the invention, is also characterized in that the air admitted into the compressor is very strongly cooled in the cold chamber of a refrigerating (or cryogenic) system using heat-absorbing, vaporizing liquids. A refrigerant or cryogenic liquid in gaseous state is compressed using a cryogenic compressor and forced into a coil where it liquefies. This liquefaction releases heat, and the liquid is then introduced into an evaporator located in the cold chamber where it vaporizes (heat-absorbing phenomenon). The vapour thus produced returns to the compressor and the cycle can start over again. The working air contained in the cold chamber is thus considerably cooled and contracted, then, still at low temperature, it is drawn in and compressed by an air compressor. In the combustion chamber, it is heated and its volume considerably increased before its quasi-isothermal transfer to the active chamber producing work, before its polytropic expansion in the engine cylinder producing work in turn.

To clarify, by way of a non-exhaustive example: to supply an active chamber of 30 cc at 30 bar, a load of 5 cc of compressed air introduced by the air compressor directly into a work and combustion chamber at 30 bar pressure and a temperature of 90 K requires a combustion which will raise the temperature to 6 times its initial value, i.e. 540 K or 267° C.

According to a variant of the invention, the working compressed air coming out of the compressor, still at low temperature, passes through an air-air heat exchanger before being directed to the combustion chamber and in this way, its temperature falls to almost ambient and its volume increases considerably before it is introduced into the combustion chamber. Thermal energy supply needs are thus considerably reduced.

To clarify, by way of a comparative example: still to supply the active chamber at 30 bar, a load of 5 cc of compressed air coming from the air compressor at 90 K, passing through an air-air heat exchanger thus raising its temperature to quasi-ambient, i.e. 270 K, and giving the volume of 15 cc to be introduced into the working and heating chamber, requires a combustion that will raise the temperature to only twice its value (i.e. 540° K), resulting in a considerable saving of energy and fuel.

According to a variant of the invention, the working compressed air coming out of the air compressor still at low temperature is directed into a large-volume, high-pressure storage reservoir where, according to its relative volume and the storage time, it almost returns to ambient temperature. It is then expanded, preferably through a dynamic pressure-reducing valve according to WO 03/089764, to an average working pressure in the combustion chamber, where it is then heated and its volume increased greatly, before its quasi-isothermal transfer into the active chamber producing work, before its polytropic expansion in the engine cylinder, producing work in turn.

According to the volume of the storage reservoir and the time spent stored in this reservoir, the return to ambient temperature can be obtained naturally, by blending with the air already contained in the reservoir. However, according to a variant of the invention, it is possible to insert an air-air heat exchanger between the compressor and the reservoir to speed up the return to ambient temperature, without changing the principle of the invention described.

The thermodynamic cycle according to this variant of the invention is thus characterized in that it consists of 9 phases:
  Large lowering of atmospheric air temperature
  Suction
  Compression
  Return to ambient at constant pressure.
  Isothermal expansion,
  Temperature increase (combustion at constant volume)
  Quasi-isothermal transfer
  Polytropic expansion
  Exhaust at ambient pressure.

The low-temperature active chamber motor-compressor unit, according to the invention, also operates in bi-mode, that is, the air compressor supplies either the high-pressure storage reservoir or the combustion chamber, or both in combination, via a shunt on the outlet duct of the air compressor, so that the high-pressure storage reservoir can be filled while the unit is operating. In the latter event, a supercharger can be favourably used if placed after the shunt on the duct leading to the high-pressure storage reservoir, for filling the reservoir at high pressure and also to feed the combustion chamber at medium pressure.

In the latter event, the unit is favourably controlled by controlling the pressure in the combustion chamber via a dynamic pressure-reducing valve positioned before the combustion chamber.

According to another variant of the invention, the working chamber heater can favourably use thermochemical processes based on absorption and desorption processes such as those used and described, for example, in patents EP 0 307297 A1 and EP 0 382586 B1. These processes use the transformation by evaporation of a fluid, for example liquid ammonium, into a gas that reacts with salts such as calcium or manganese chlorides or others. The system operates like a thermal battery where, in the first phase, the evaporation of the ammonium reserve contained in an evaporator produces cold, on the one hand and, on the other, a chemical reaction in the reactor containing the heat-releasing salts. When the ammonium reserve is exhausted, the system is rechargeable in the second phase by supplying heat in the reactor which reverses the reaction where the ammonia is separated from the chloride, and it returns to a liquid state by condensation.

The thermochemical heater thus described uses the heat produced during phase 1 to increase the pressure and/or the volume of the compressed air coming from the high-pressure storage reservoir, before its introduction into the expansion chamber of the engine cylinder.

During phase 2, the system is regenerated by the heat supply released by the engine exhausts or any other heat source.

According to a variant of this invention, the motor-compressor-motor-generator unit is fitted with both a thermal heater with a burner (or other) and a thermochemical heater of the type previously cited, which could be used jointly or successively during phase 1 of the thermochemical heater, where the thermal heater with the burner is used to regenerate (phase 2) the thermochemical heater when the latter is empty, by using the heater with the burner to heat its reactor during operation of the unit.

According to a variant of the present invention, the low-temperature active chamber motor-compressor can favourably use an external-external combustion chamber, that is, one in which the working compressed air is not in contact with the flame, the compressed air being heated through an air-air heat exchanger. In this case, the engine exhaust air is recycled in the cold chamber of the refrigerating or cryogenic system to restart a new cycle and the low-temperature motor-compressor unit operates in closed cycle. In this configuration, the atmospheric air inlet in the cold chamber is removed. With this solution, an expanded air at approximately atmospheric pressure, possibly even slightly over-pressure, and at a temperature lower than ambient can be reintroduced into the cold chamber. To clarify, by way of a non-exhaustive example, a load of 30 cc introduced into the active chamber at a temperature of 540 K (267° C.) and expanded in an engine cylinder of 300 cc will be at a temperature of the order of 200 K (−73° C.) at the start of the exhaust phase, making its cooling in the cold chamber of the refrigerating or cryogenic system that much easier.

In this case, the working air can be favourably replaced by a moisture-free gas, such as nitrogen, to prevent the formation of frost on the heat exchanger of the evaporator of the cold chamber, thus retaining its efficiency.

When the engine exhaust temperature is greater than ambient temperature, an air-air heat exchanger that returns the engine exhaust air temperature to quasi-ambient is placed on the duct before the cold chamber.

The low-temperature active chamber motor-compressor unit operates in mono-energy air, without an external energy supply, by using the air contained in the storage reservoir, preferably expanded through a dynamic pressure-reducing valve according to WO 03/089764 at medium pressure in the combustion chamber, before its quasi-isothermal transfer into the active chamber producing work, before its polytropic expansion in the engine cylinder producing work in turn.

In this case, the compressor is then placed in dry run position, with the inlet and exhaust ducts of this compressor kept closed, the compressor of the refrigerating system no longer running and the combustion chamber heating device not activated.

According to an operating variant, the motor-compressor unit according to the invention operates in bi-energy by using the compressed air contained in the storage reservoir expanded, preferably, through a dynamic pressure-reducing valve according to WO 03/089764 to medium pressure in the combustion chamber where it is then heated and its volume considerably increased before its quasi-isothermal transfer into the active chamber producing work, before its polytropic expansion in the engine cylinder producing work in turn.

In this case, the compressor is then placed in dry run position, with the inlet and exhaust ducts of this compressor kept closed, the compressor of the refrigerating system no longer running and the combustion chamber heating device activated.

According to a variant of the invention, the motor-compressor unit operates in bi-energy, that is, in mono-energy air in certain operating conditions, for example for a vehicle in urban areas, and/or in mono-energy fuel in other operating conditions, for example, for the same vehicle on the highway.

The exhaust duct of the compressor feeds the combustion chamber and/or the high-pressure storage reservoir, successively or simultaneously, via a flow-controlled shunt on its exhaust duct. For high-pressure storage and simultaneous medium working pressure combustion, an air supercharger is then positioned on the duct between the shunt and the storage reservoir.

The compression mode of the refrigerating system, the evaporators and the heat exchangers, the materials used, the refrigerants or cryogenic liquids used to implement the invention may vary without this changing the invention described. Among refrigerants and cryogenic liquids, nitrogen, hydrogen and helium may be used to obtain the desired results.

Any mechanical, hydraulic, electrical or other device for completing the cooling, compression and work cycles of the active chamber, namely introducing the load admitted by increasing the volume, producing work, followed by maintaining a given volume which is the actual volume of the chamber during the expansion travel of the engine piston, than return to the minimum volume to allow a new cycle, can be used without this changing the invention that has just been described.

Preferably, the variable-volume expansion chamber known as the active chamber, is made up of a piston, known as the pressure piston, sliding in a cylinder and linked by a connecting rod to the engine crankshaft. However, other mechanical, electrical or hydraulic devices that enable the same functions and the thermodynamic cycle of the invention to be carried out may be used without this changing the principle of the invention.

Preferably, the whole device (piston and pressure lever) is balanced by extending the lower arm beyond its fixed end, or pivot, by a mirror pressure lever in the opposite direction, symmetrical and with identical inertia to the one it is attached to, able to move along an axis parallel to the piston's axis, a mass of inertia that is identical and in the opposite direction to that of the piston. Inertia is the product of the mass multiplied by the distance of its centre of gravity to the reference point. In the case of a multi-cylinder engine, the opposing mass can be a piston operating normally like the piston it is balancing.

The device according to the present invention preferably uses the latter arrangement in which the axis of the opposing cylinders and the fixed point of the pressure lever are approximately aligned along the same axis and where the pin of the control connecting rod linked to the crankshaft is positioned elsewhere, not on the pin common to the articulated arms but on the arm itself between the common pin and the fixed point or pivot. In this way, the lower arm and its symmetry represent a single arm with the pivot, or fixed point, approximately in its centre and two pins at each of the free ends linked to opposing pistons.

The number of cylinders can vary without this changing the principle of the invention, although it is preferable to use even-numbered assemblies of pairs of opposing cylinders, with more than two cylinders, for example four or six, to obtain greater cyclical regularity.

During operation in mono-energy compressed air mode, for example, for a vehicle driven in an urban area, only the pressure of the compressed air stored in the high-pressure reservoir is used. In fossil fuel or other mode, for example, for a vehicle driven on the open road, the capacity is then required to be heated to increase the temperature of the air passing through it and consequently its usable volume and/or pressure, for the work of charging the chamber and expansion.

The engine according to the invention is favourably controlled by controlling the pressure in the combustion chamber, and an electronic computer controls the quantity of fossil energy supplied when operating in supplementary energy mode, according to the pressure in the said work capacity.

According to a variant of the invention, the working air compressor can be made up of several stages. In this case, the air will be cooled between each stage by passing back through the refrigerating or cryogenic system, the displacement of each later stage being lower than that of the previous stage.

According to another variant of the invention, the engine is made up of multiple expansion stages, each stage comprising an active chamber according to the invention. Between each stage is positioned a heat exchanger which heats the exhaust air from the previous stage and/or a heating device using supplementary energy if required. The displacement of the later stage is larger than that of the previous stage.

For a mono-energy compressed air unit, the expansion in the first cylinder having lowered the temperature, the air is favourably heated in an ambient temperature heat exchanger.

For a bi-energy engine in supplementary energy mode, the air is heated in a thermal heater using supplementary energy, for example, fossil fuel.

According to a variant of this arrangement, after each stage, the exhaust air is directed towards a single heater with several stages.

The heat exchangers can be air-air heat exchangers, or air-liquid, or any other device or gas producing the desired effect.

The low-temperature, continuous "cold" combustion, constant pressure motor-compressor unit favourably uses an active chamber according to WO 2005/049968. However, according to numerous variants of the invention, it is possible to use expansion devices from conventional engines, such as connecting rod, standard crankshaft, rotary pistons or others, and likewise for compression devices, for which the number of compression stages and their design—alternating pistons, rotary pistons, turbine—may vary without this changing the principle of the invention described.

The active chamber low-temperature motor-compressor unit according to the invention can be used in all land, maritime, railway or aeronautical vehicles.

The active chamber low-temperature motor-compressor unit according to the invention can also favourably find applications in emergency generating units, electricity breakdown repairs and production, and also in numerous domestic cogeneration applications for producing electricity, heating and air-conditioning.

BRIEF DESCRIPTION OF THE DRAWING FIGURES

Other aims, benefits and characteristics of the invention will be seen upon reading the descriptions of various possible, but non-exhaustive configurations shown in the attached diagrams, where:

FIG. 7 is a diagram of a motor-compressor unit according to the invention in its closed cycle, external-external combustion chamber configuration.

DETAILED DESCRIPTION OF THE INVENTION

Figure 1:
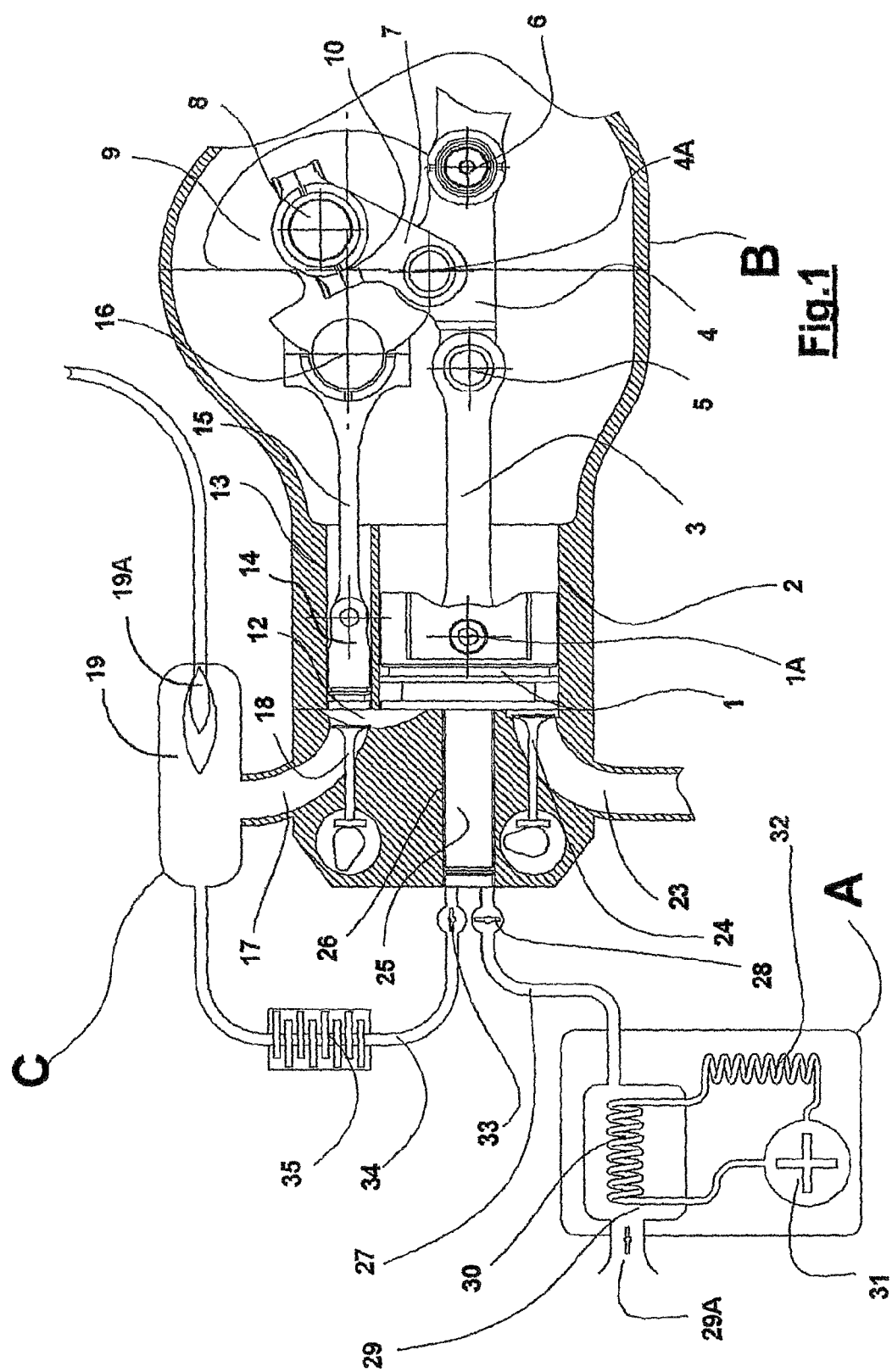
FIG. 1 is a cross-section diagram of a cold combustion, active chamber motor-compressor unit according to the invention.

FIG. 1 is a cross-section diagram of a low-temperature, active chamber motor-compressor unit according to the invention, comprising three main components: a refrigerating or cryogenic system A, a motor-compressor unit B and the external combustion device C, showing the engine piston 1 (represented at its top dead centre), sliding in cylinder 2 and controlled by a pressure lever. The engine piston 1 is connected by its pin to the free end 1A of a pressure lever made up of an arm 3, articulated on a pin 5 common to another arm 4, fixed oscillating on an immovable pin 6, and on which is provided, approximately in its middle, a pin 4A to which is attached a control connecting rod 7 connected to the crankpin 8 of a crankshaft 9 turning on its axis 10. When the crankshaft rotates, the control connecting rod 7, through the lower arm 4 and its pin 4A, exercises a force on the common pin 5 of arms 3 and 4 of the pressure lever, thus moving the piston 1 along the axis of the cylinder 2, and transmits in return the forces exercised on the piston 1 during the engine stroke to the crankshaft 9, thus causing it to rotate. The upper part of the engine cylinder is connected with the active chamber cylinder 13 via a passage 12 in which a piston 14 known as the pressure piston slides, connected by a connecting rod 15 to a crankpin 16 of the crankshaft 9. An inlet duct 17 controlled by a valve 18 discharges into the passage 12 linking the engine cylinder 2 and the active chamber cylinder 13 and supplies the engine with compressed air from the work chamber 19 which comprises a continuous (or approximately continuous) combustion device represented by a burner 19A that can be supplied by a fossil fuel, biofuel, or even an alcohol or a gas, maintained at approximately constant pressure. In the upper part of the engine cylinder 2, an exhaust duct 23 controlled by an exhaust valve 24 is provided.

The engine piston 1, interlinked with its crown, comprises a second stage 25, a force plate that slides interdependently with the engine piston 1 in a compression cylinder 26 that is supplied with atmospheric air at very low temperatures via a duct 27 through a valve 28, from a cold chamber 29 in which the evaporator 30 of a refrigerating or cryogenic system A is installed, as well as a cryogenic liquid compressor 31 driven by the crankshaft 10 (the driving is not represented on the diagram) and a liquefaction heat exchanger 32. The upper part of the compression cylinder 26 also has an exhaust valve 33 allowing the combustion chamber 19 to be supplied via an exhaust duct 34 after crossing an ambient heat exchanger 35.

The unit is controlled by a throttle 29A, positioned on the cold chamber input 29.

Figure 2:
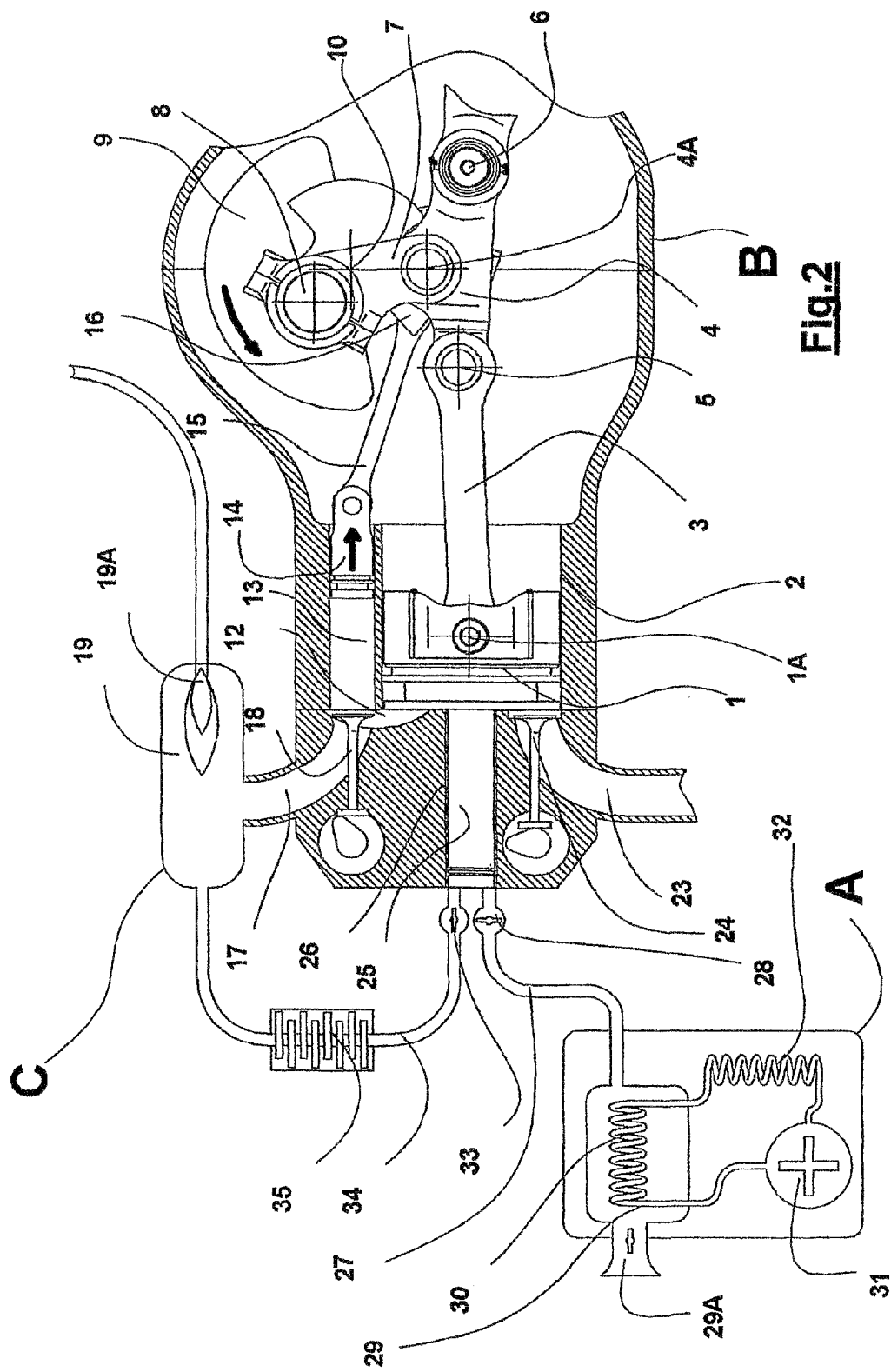
FIGS. 2 to 4 are cross-section diagrams of the different operating phases of the motor-compressor unit according to the invention.

FIG. 2 is a cross-section diagram of the active chamber engine according to the invention during the inlet phase. Engine piston 1 is stopped at its top dead centre and inlet valve 18 has just been opened, the air pressure contained in work capacity 19 pushes the pressure piston 14 while filling the cylinder of the active chamber 13 and producing work by rotating crankshaft 9 via its connecting rod 15, the work being considerable as it is produced at quasi-constant pressure.

Figure 3:
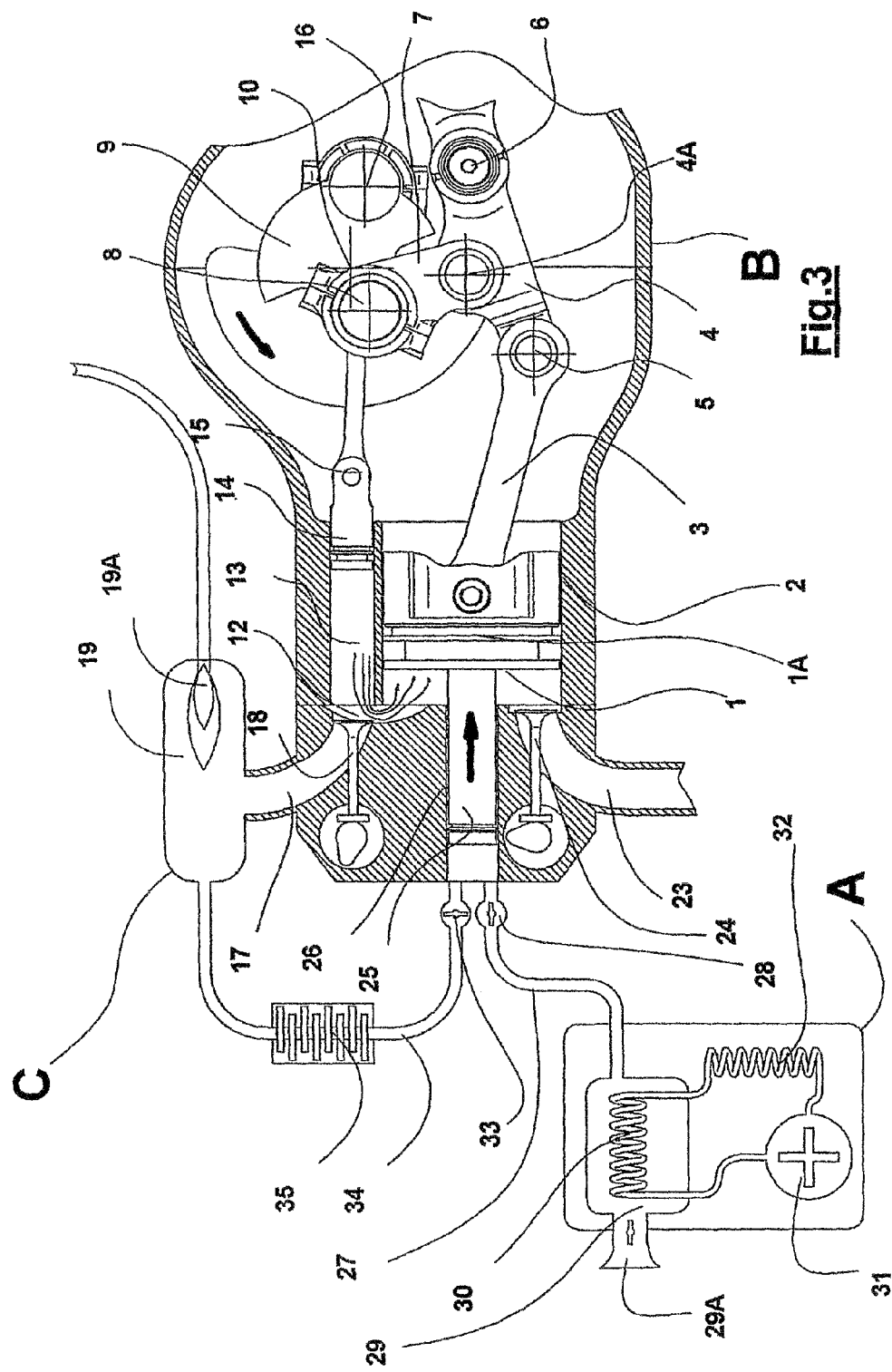

In continuing to rotate, the crankshaft causes the engine piston 1 to move to its bottom dead centre (FIG. 3) and almost simultaneously, the inlet valve 18 closes again. The pressure contained in the active chamber expands, pushing the engine piston 1 and producing work in turn by causing crankshaft 9 to rotate through its driveline assembly made up of the arms 3 and 4 and the control connecting rod 7.

The downward travel of the engine piston 1 drives the force plate 25, drawing in the atmospheric air that has been strongly cooled in the cold chamber 29 where the very low-temperature evaporator 30 of the cryogenic system is installed, while the gaseous cryogenic liquid, first compressed by the compressor 31 in the heat exchanger 32 (heat source) where it liquefies, is forced back into the evaporator 30 (cold source) where the pressure is lower so it vaporizes (absorbing heat) before returning in a gaseous state to the compressor 31 and restarting a new cycle.

Figure 4:
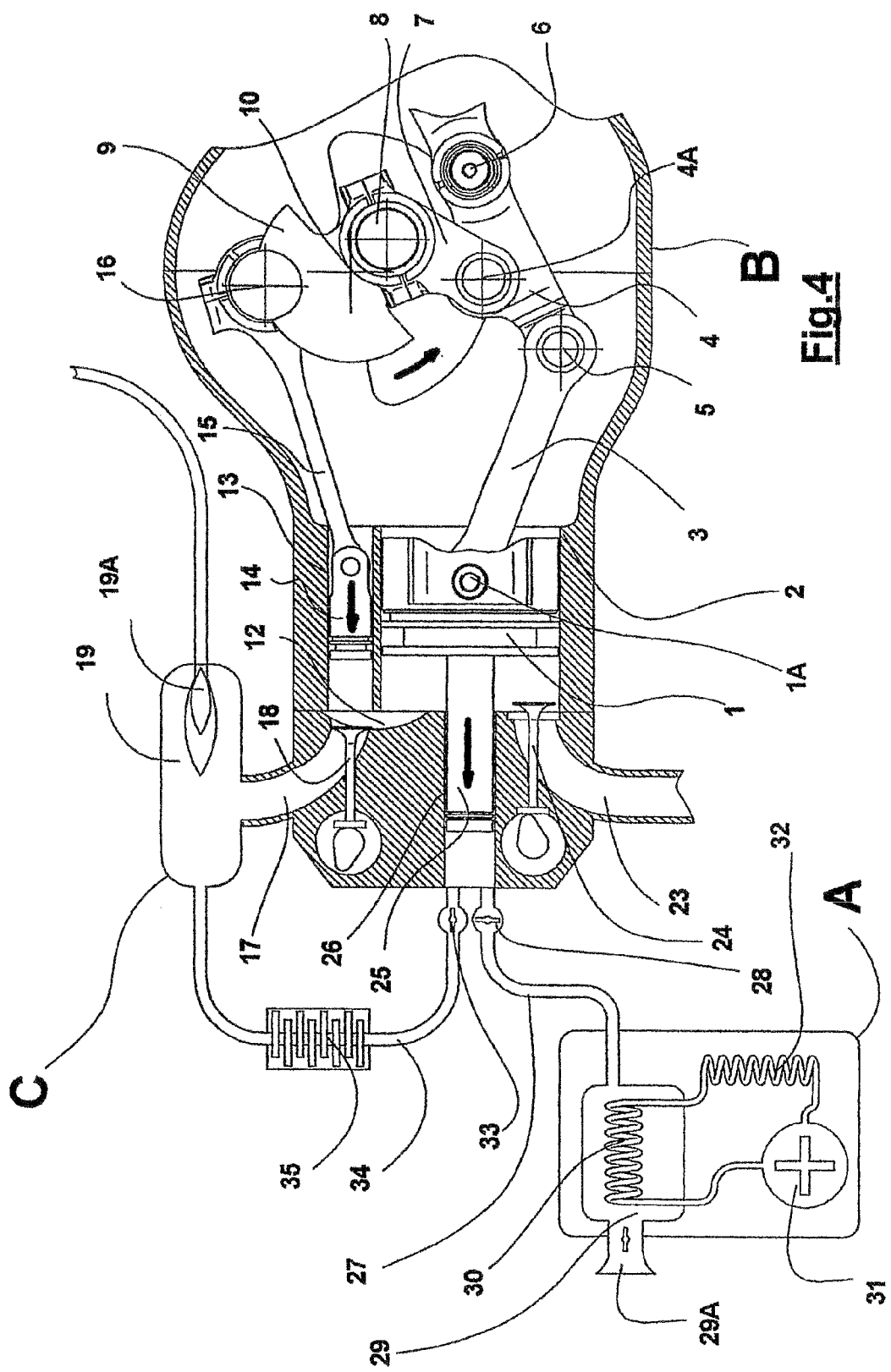

During this cycle of the engine piston 1, the pressure piston 14 continues its travel to its bottom dead centre and starts back up towards its top dead centre, all the components being adjusted so that during the pistons' upward travel (see FIG. 4), the pressure piston 14 and the engine piston 1 will arrive almost simultaneously at their top dead centres, where the engine piston 1 will stop and the pressure piston 14 will start a new downward travel to begin a new cycle. During the upward travel of the two pistons 1, 14, the exhaust valve 24 opens to remove expanded air through the exhaust duct 23, while the force plate 25 forces the compressed air, still at low temperature, back through a heat exchanger 35, where this compressed air returns to a temperature close to ambient by increasing its volume for it to be admitted into the combustion chamber 19.

Figure 5:
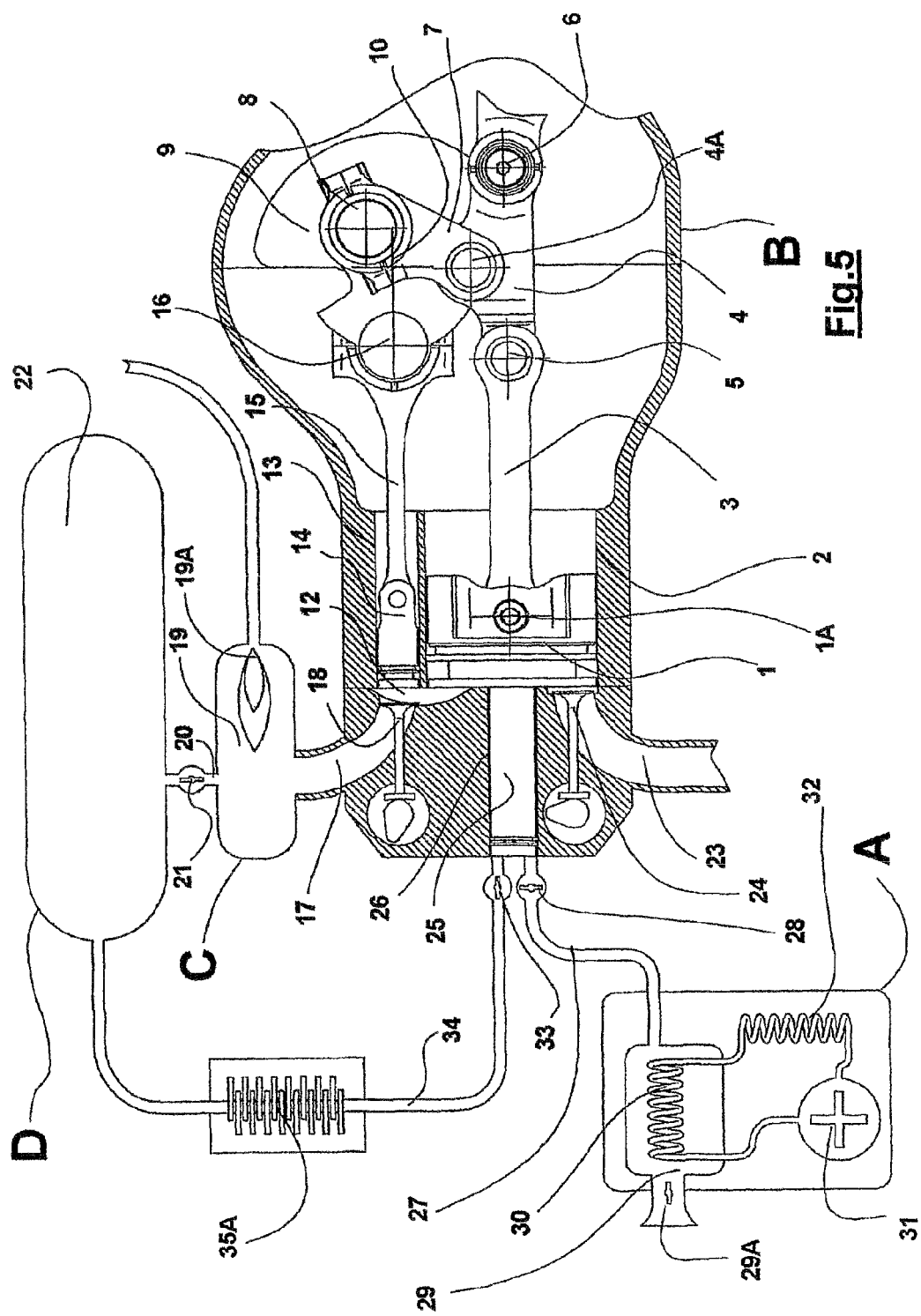
FIG. 5 is a diagram of a motor-compressor unit according to the invention in mono-energy fuel configuration.

FIG. 5 is a cross-section diagram of a motor-compressor unit according to the invention where the compressed air, still at low temperature, coming out of the air compressor is directed into a high-pressure large-volume storage reservoir is a cross-section diagram, a low-temperature, active chamber motor-compressor unit according to the invention comprising three main components, a refrigerating or cryogenic system A, a motor-compressor B and its external combustion device C as well as a high-pressure storage reservoir D where can be seen: the engine piston 1 (represented at its top dead centre), sliding in a cylinder 2, and controlled by a pressure lever. The engine piston 1 is connected by its pin to the free end 1A of a pressure lever made up of an arm 3 articulated on a pin 5 common to another arm 4 fixed oscillating on an immovable pin 6. On the pin 5 common to the arms 3 and 4, a control connecting rod 7 is connected to a crankpin 8 of a crankshaft 9 turning on its axis 10. When the crankshaft rotates, the control connecting rod 7 exercises a force on the common pin 5 of the arms 3 and 4 of the pressure lever, thus moving the piston 1 along the axis of cylinder 2 and transmits in return the forces exercised on the piston 1 during the engine stroke to the crankshaft 9, thus causing it to rotate. The upper part of the engine cylinder is connected via a passage 12 with the active chamber cylinder 13 in which slides a piston 14 known as the pressure piston, connected by a connecting rod 15 to a crankpin 16 of the crankshaft 9. An inlet duct 17 controlled by a valve 18 discharges into the passage 12 linking the engine cylinder 2 and the active chamber cylinder 13, and supplies the engine with compressed air from the work capacity 19, which has a continuous (or almost continuous) combustion device, represented by a burner 19A, that can be fuelled by a fossil fuel, biofuel, or even a vegetable oil, an alcohol or a gas, maintained at approximately constant pressure and itself supplied with compressed air from the high-pressure storage reservoir 22 through a duct 20 controlled by a dynamic pressure-reducing valve 21. Exhaust duct 23 controlled by exhaust valve 24 is provided in the upper part of engine cylinder 2.

The engine piston 1, interlinked with its crown, comprises a second stage 25, a force plate that slides interdependently with the engine piston 1 in a compression cylinder 26 that is supplied, by a duct 27 through a valve 28, with very low-temperature air at atmospheric pressure, coming from a cold chamber 29 in which the evaporator 30 of a refrigerating or cryogenic system A is installed, as well as a cryogenic liquid compressor 31 driven by the crankshaft 10 (the driving is not represented on the diagram) and a liquefaction heat exchanger 32. The upper part of the compression cylinder 26 also has an exhaust valve 33 allowing the combustion chamber 19 to be supplied via an exhaust duct 34 after crossing an ambient heat exchanger 35.

A device controlled by an accelerator pedal in combination with the throttle 29A operates the dynamic pressure-reducing valve 21 to regulate the pressure in the work chamber and thus control the engine.

Figure 6:
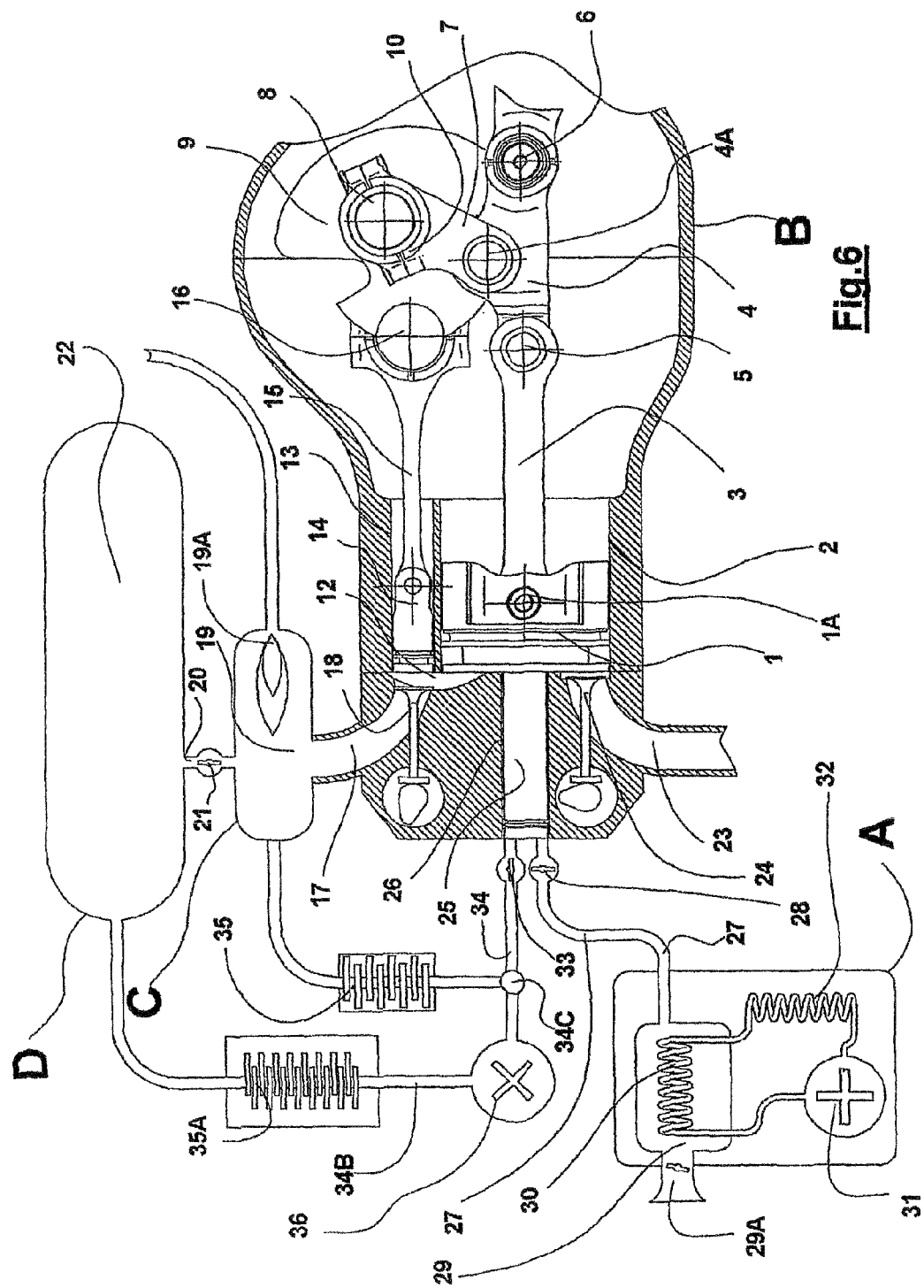
FIG. 6 is a diagram of a motor-compressor unit according to the invention in bi-energy bi-mode configuration.

FIG. 6 is a cross-section diagram of a motor-compressor unit according to the invention in bi-energy and bi-mode version, where the air compressor of the unit supplies either the high-pressure storage reservoir 22 or the combustion chamber 19, or both in combination. The exhaust duct of the compressor 34 includes a shunt 34A towards the combustion chamber 19 through an air-air heat exchanger 35, and the duct 34B, towards the high-pressure storage reservoir 22 through a heat exchanger 35A to bring the temperature of the compressed air close to ambient before its introduction into the HP storage reservoir. An air supercharger 36 is then positioned on the duct 34B between the shunt 34A and the reservoir, so that the compressed air can be stocked in the reservoir 22 at a pressure higher than the combustion chamber 19 work pressure. According to the characteristics and dimensions of the supercharger, on which the temperatures of the compressed air depend, the supercharger 36 is positioned before or after the heat exchanger 35A. This configuration according to the invention allows the reservoir 22 to be filled during operation of the unit.

A pilot valve 34C allows the flow of compressed air in the combustion chamber and the reservoir to be distributed according to needs.

FIG. 7 is a cross-section diagram of a low-temperature, continuous "cold" combustion, constant pressure, active chamber, closed cycle motor-compressor unit, operating with an external-external combustion chamber, where in A and B, components identical to the preceding descriptions can be seen, with the exception of the exhaust 23 which is re-circulated by a duct 37 in the cold chamber 29. The external-external combustion chamber consists of a burner 19A operating like a kind of boiler or furnace which, through an air-air heat exchanger 19B, heats up an expansion chamber 19C, in which the compressed air at working pressure arriving at almost ambient temperature through duct 34 and the heat exchanger 35, will increase its temperature and volume at constant pressure, pushing the pressure piston 14 while filling the cylinder of the active chamber 13 and producing work, and rotating the crankshaft 9 via its connecting rod 15, to then undergo polytropic expansion in the engine cylinder 2 where it will push the engine piston 1 producing work in turn by rotating the crankshaft 9 through its driveline assembly. An exhaust duct 19D for the hot air generated by the burner releases into the atmosphere the gases burned in the furnace. A throttle 21A positioned on the inlet duct 17 and a boiler temperature regulator controls the unit.

It should be noted that in this configuration, the exhaust air from the engine can be at a temperature lower than 0° and is thus more easily cooled in the cold chamber.

The invention is not limited to the examples of configurations described and represented: the materials, the means of control and the devices described may vary, while remaining equivalent, to produce the same results, without this changing in any way the invention described.

The description and claims of the present invention use the following designations for air temperature values: very low temperatures, low temperatures, ambient or ambient temperature and "cold" combustion. Operating temperatures are in fact relative, however, to clarify, though in a non-limiting way, the author uses the terms: Very low temperatures for values lower than 90 K—Low temperatures for values lower than 200 K—Ambient between 273 and 293 K—As for "cold" combustion, this is in comparison with current engine combustions that are higher than 2000 K, and can thus be between 400 and 1000 K.

The invention claimed is:

1. A low-temperature, continuous cold combustion, constant pressure, active chamber motor-compressor unit, comprising:
  a motor-compressor unit (B) configured to operate with compressed atmospheric air and comprised of
  i) an engine piston (1) slidable in an engine cylinder (2) to a top dead center position for a period of time,
  ii) a piston travel control device (3) that stops the piston at the top dead center position,
  iii) an active chamber cylinder (13) fitted with a pressure piston (14) that produces work during filling of the active chamber cylinder (13),
  iv) an expansion chamber (12) linking the engine cylinder (2) and the active chamber cylinder (13), the expansion chamber (12) having a variable volume, and
  an air compression device (28, 25, 26, 33) that compresses atmospheric air supplied at a reduced temperature;
  a refrigerating system (A) that supplies the atmospheric air at the reduced temperature to an inlet (28) of the air compression device, the refrigerating system (A) being comprised of a cold chamber (29) that reduces a temperature of input atmospheric air from an ambient temperature to the reduced temperature;
  an external combustion device (C) comprised of an external combustion chamber (19) and a constant pressure heating device (19A), an inlet of the combustion chamber (19) being connected to an outlet (33) of the air compression device to receive the compressed air as working compressed air, wherein the working compressed air is increased in volume within the combustion chamber by heat from the constant pressure heating device (19a); and
  an inlet duct (17) connecting an outlet of the combustion chamber to the expansion chamber (12),
  wherein, i) when the engine piston (1) is stopped at the top dead center position, the working compressed air is passed from the combustion chamber (19) and admitted to the expansion chamber (12) when the expansion chamber (12) has a smallest volume to thereby fill the active chamber cylinder (13) so that the pressure piston (14) produces the work during the filling of the active chamber cylinder (13), ii) under thrust of the admitted working compressed air, the expansion chamber (12) increases in volume and produces further work by the compressed air contained in the expansion chamber (12) expanding in the engine cylinder (2) thus pushing the engine piston (1) downwards to thereby supply the further work, and iii) during an upwards travel of the engine piston (1) during an exhaust stroke, the variable volume in the expansion chamber is returned to the smallest volume to restart a complete work cycle.

2. The low-temperature, continuous cold combustion, constant pressure, active chamber motor-compressor unit according to claim 1, further comprising a heat exchanger (35) located between the outlet (33) of the air compression device and the inlet of the combustion chamber (19), wherein the heat exchanger (35) returns the working compressed air to the ambient temperature prior to introduction into the external combustion chamber.

3. The low-temperature, continuous cold combustion, constant pressure, active chamber motor-compressor unit according to claim 1, wherein the unit is configured such that a thermodynamic cycle of the unit comprises:
    lowering the temperature of the input atmospheric air temperature in the refrigerating system;
    suction of the air supplied at the reduced temperature from the refrigerating system by the air compression device;
    compression of the air by the air compression device;
    increasing a temperature of the working compressed air by the constant pressure heating device (19A);
    quasi-isothermal transfer at constant pressure in the active chamber cylinder (13);
    polytropic expansion in the engine cylinder (2); and
    air exhaust at ambient pressure through an engine exhaust (23).

4. The low-temperature, continuous cold combustion, constant pressure, active chamber motor-compressor unit according to claim 3, wherein,
    the input air is cooled in the cold chamber by a heat-absorbing vaporizing liquid, and
    the refrigerating system includes a gaseous refrigerant, a cryogenic compressor that compresses the gaseous refrigerant, a coil in which the gaseous refrigerant liquefies to release heat, and an evaporator positioned in the cold chamber for vaporizing the refrigerant such that produced vapor returns to the cryogenic compressor for restarting a refrigerating cycle.

5. The low-temperature, continuous cold combustion, constant pressure, active chamber motor-compressor unit according to claim 4, further comprising:
    a compressed air storage reservoir (22) connected to the combustion chamber (19) and to the outlet (33) of the air compression device for storage of the working compressed air prior to admission to the combustion chamber (19), and
    a dynamic pressure-reducing valve (21) through which the working compressed air stored in the storage reservoir (21) is expanded to an average working pressure in and admitted to the combustion chamber for heating prior to quasi-isothermal transfer into the active chamber cylinder (13) and subsequent polytropic expansion in the engine cylinder.

6. The low-temperature, continuous cold combustion, constant pressure, active chamber motor-compressor unit according to claim 5, further comprising:
    an air-air heat exchanger positioned upstream of the storage reservoir, the air-air heat exchanger raising air temperature and increasing air volume of the working compressed air prior to introduction into the storage reservoir.

7. The low-temperature, continuous cold combustion, constant pressure, active chamber motor-compressor unit according to claim 5, wherein the unit is configured such that a thermodynamic cycle of the unit comprises:
    a lowering of the temperature of the input air in the refrigerating system;
    suction of the air supplied at the reduced temperature from the refrigerating system by the air compression device;
    compression of the air by the air compression device;
    a return of the air to ambient temperature in the heat exchanger (35);
    a quasi-isothermal transfer in the active chamber cylinder (13);
    a temperature increase including combustion at constant volume by the constant pressure heating device (19A);
    quasi-isothermal transfer at constant pressure in the active chamber cylinder (13);
    polytropic expansion in the engine cylinder (2); and
    exhaust at ambient pressure through an engine exhaust (23).

8. The low-temperature, continuous cold combustion, constant pressure, active chamber motor-compressor unit according to claim 5, wherein,
    the air compression device is configured to supply the storage reservoir (22) and the combustion chamber (19) selectively i) successively, and ii) simultaneously, such that the storage reservoir can be filled while the unit is operating.

9. The low-temperature, continuous cold combustion, constant pressure, active chamber motor-compressor unit according to claim 8, further comprising:
    a supercharger (36) positioned upstream of the storage reservoir such that, during the operation of the unit, the storage reservoir is configured to be filled at a high pressure while the combustion chamber is simultaneously supplied at a lower pressure than the storage reservoir.

10. The low-temperature, continuous cold combustion, constant pressure, active chamber motor-compressor unit according to claim 1, further comprising:
    a compressed air storage reservoir (22) connected to the combustion chamber (19) and to the outlet (33) of the air compression device for storage of the working compressed air prior to admission to the combustion chamber (19),
    a dynamic pressure-reducing valve (21) through which the working compressed air stored in the storage reservoir (21), wherein,
    during unit operation in a mono-energy mode, i) the working compressed air, without an external energy supply, supplied from the storage reservoir is expanded through the dynamic pressure-reducing valve prior to quasi-isothermal transfer in the active chamber cylinder (13) producing the work and subsequent polytropic expansion in the engine cylinder further producing work with the air compression device placed in a dry run position with inlet (28) and the outlet (33) of the air compression device being closed, and the air compression device not being driven and the heating device (19A) of the combustion chamber not being activated.

11. The low-temperature, continuous cold combustion, constant pressure, active chamber motor-compressor unit according to claim 10,
wherein the unit operates in a bi-energy mode using stored compressed air from the storage reservoir plus combustion in the combustion chamber.

12. The low-temperature, continuous cold combustion, constant pressure, active chamber motor-compressor unit according to claim 1, wherein the refrigerating system (A) further comprises a thermal heater, using an evaporator (30) to create a thermochemical gas-solid reaction by evaporative transformation of a reagent fluid contained in the evaporator.

13. The low-temperature, continuous cold combustion, constant pressure, active chamber motor-compressor unit according to claim 12, wherein the thermochemical gas-solid reaction in the thermal heater includes a solid reagent selected from metal salts and a reagent fluid selected from liquid ammonium and a gas reactive with the metal salts such that the thermochemical gas-solid reaction produces heat.

14. The low-temperature, continuous cold combustion, constant pressure, active chamber motor-compressor unit according to claim 13 wherein, the thermochemical gas-solid reaction is selected such that heating the thermal heater regenerates a completed reaction to desorb the reagent fluid so that the reagent fluid recondenses in the evaporator.

15. The low-temperature, continuous cold combustion, constant pressure, active chamber motor-compressor unit according to claim 1, wherein, the constant pressure heating device (19A) comprises an external-external heating device positioned in the combustion chamber (19) to heat the working compressed air without direct contact with a flame.

16. The low-temperature, continuous cold combustion, constant pressure, active chamber motor-compressor unit according to claim 15, wherein,
the motor-compressor unit (B) further comprises an exhaust duct through which air exiting the motor-compressor unit (B) is recycled in the cold chamber of the refrigerating system to restart a new cycle such that the unit operates in a closed cycle.

17. The low-temperature, continuous cold combustion, constant pressure, active chamber motor-compressor unit according to claim 16, further comprising an air-air heat exchanger (35A) positioned on the exhaust duct (34B) upstream of the compressed air storage reservoir (22) to return exhaust air temperature to approximately ambient temperature.

18. The low-temperature, continuous cold combustion, constant pressure, active chamber motor-compressor unit according to claim 1, wherein the pressure piston (14) of the active chamber cylinder (13) is connected to a connecting rod (15) and a crankpin (16) of a crankshaft (9) connected to the engine piston (1).

* * * * *

UNITED STATES PATENT AND TRADEMARK OFFICE
CERTIFICATE OF CORRECTION

PATENT NO. : 8,677,730 B2
APPLICATION NO. : 11/993351
DATED : March 25, 2014
INVENTOR(S) : Negre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1809 days.

Signed and Sealed this

Twenty-ninth Day of September, 2015

Michelle K. Lee
*Director of the United States Patent and Trademark Office*